2,779,760

LITHIUM MALTOBIONATE AND PROCESS FOR MAKING SAME

Horace S. Isbell, Washington, D. C., and Robert Schaffer, Silver Spring, Md., assignors to the United States of America as represented by the Secretary of Commerce No Drawing. Application April 21, 1955,
Serial No. 503,037

4 Claims. (Cl. 260—210)

This invention relates to a new crystalline salt lithium maltobionate and a process for making the same.

Heretofore there has been no practical derivative available for the purification of maltobionic acid with the exception of the expensive and highly poisonous brucine salt. In accordance with the practice of this invention a means is made available for readily extracting maltobionic acid from mixtures comprising the reaction products of maltose. By making available a crystalline maltobionate salt the separation and isolation of maltobionic acid is practicable, whereas the use of previously known substances such as calcium maltobionate, which exists only in an amorphous state as an extracting agent, resulted in the end product having impurities in the form of calcium salts present.

Accordingly, it is an object of this invention to produce an inorganic crystalline salt suitable for separating maltobionic acid from solutions.

Another object of this invention is to obtain a derivative of maltobionic acid suitable for the isolation of isotopically labeled maltobionic acid as an intermediate in the synthesis of maltose labeled with an isotope of carbon.

Other objects and advantages of this invention will be apparent from the description of the invention which follows:

As is well known, maltobionic acid does not crystallize from solution nor is it distillable. Therefore there has been no satisfactory way of purifying it in an economical manner. In order to extract maltobionic acid it would therefore be desirable to provide a salt or derivative of maltobionic acid. In accordance with the present invention, the above objects are accomplished by a new compound lithium maltobionate having the formula:

$$LiC_{12}H_{21}O_{12}.3H_2O$$

which crystallizes readily from water or from water diluted with a miscible solvent such as ethanol, methanol, 2-propanol, dioxane, acetone, etc. The salt forms large crystals easily separated by filtration, centrifugation or gravity. The salt may be obtained most economically from a solution resulting from the electrolytic oxidation of maltose in the presence of lithium bicarbonate and lithium bromide. By this method it may be prepared cheaply from maltose and hence it can be used economically as an intermediate for the production of maltobionates of diverse character.

The process of crystallizing lithium maltobionate from solution is particularly applicable for the production of $C^{14}$ labeled maltobionic acid obtained from 3-($\alpha$-D-glucosyl)-D-arabinose by means of the cyanohydrin synthesis employing $C^{14}$ labeled cyanide. Crystallization of the new salt from the hydrolyzed cyanohydrin mixture serves for separation of the epimeric products and use of the salt (prepared from nonlabeled maltobionic acid) as a carrier further provides a means for recovery of all of the labeled maltobionate from the reaction mixture.

In applicant's prior patent, Serial No. 1,976,731, issued on October 16, 1934, there is disclosed a process wherein oxidation of aldose sugars to their acids and salts is effected electrolytically in the presence of a catalyst. Such teachings can effectively be employed in connection with the process of the present invention to effect the conversion of maltose to lithium maltobionate in the following manner.

A carbon dioxide saturated solution containing 10 g. of lithium bromide, 37 g. of lithium carbonate, 90 g. of maltose hydrate and one liter of water is placed in a 3-neck flask equipped with graphite electrodes and a mechanical stirrer. A direct current of about 0.5 ampere is passed through the solution with continuous stirring. After 27 to 30 ampere hours of current has been used, conversion of maltose to lithium maltobionate is substantially complete and the current is stopped. The electrolyzed solution is passed over a filter coated with a decolorizing carbon and is then concentrated under reduced pressure to 125 ml. The solution is then mixed with 20 ml. of 2-propanol and is then set aside for crystallization. In the absence of seed crystals, crystallization may take several weeks; crystallization is readily initiated by the seeding of the solution with a few crystals of lithium maltobionate made by a previous run. An abundant crop of crystalline lithium maltobionate separates in the course of several hours. The crystals are separated, washed with aqueous 2-propanol and dried. The mother liquor is concentrated and additional crystalline lithium maltobionate is separated by the addition of 2-propanol.

The yield of crystalline lithium maltobionate thus obtained corresponds to about 85 percent of the maltose used. By employing the mother liquor as an electrolyte for subsequent runs, with addition of maltose and lithium carbonate, nearly quantitative yields of the salt can be obtained. Lithium maltobionate is recrystallized by dissolution in one part hot water followed by the gradual addition of two parts 2-propanol; in the course of several hours at 25° C. approximately 0.9 part of crystalline lithium maltobionate separates. Satisfactory crystallization can be obtained by the addition of methanol, ethanol, dioxane, and acetone in place of 2-propanol used in the example. The new compound corresponds to the formula $LiC_{12}H_{21}O_{12}.3H_2O$. In one percent aqueous solution $[\alpha]_D^{20} = +97.3°$; at 20° C., 44 g. dissolve in 100 g. of water.

The lithium salt may be used as such, or it may be used for the preparation of maltobionolactone by the procedure of our copending patent application, Serial No. 509,125, filed May 17, 1955. If the process of the present invention is used in connection with the synthesis of maltobionic-1-$C^{14}$ acid, then the procedure is as follows:

A mixture consisting of one millimole of 3-($\alpha$-D-glucosyl)-D-arabinose, one millimole sodium cyanide-$C^{14}$, one millimole sodium carbonate, and 10 ml. of water is stored in a sealed tube at room temperature. After one week hydrolysis of the resulting cyanohydrins is effected by the addition of 0.5 millimole of sodium carbonate and heating in a water bath until the evolution of $NH_3$ ceases. The solution is then passed over a column containing a cation exchange resin (Amberlite IR120). The column is washed with water; the combined eluant is neutralized with lithium hydroxide and then concentrated under reduced pressure to a thin sirup. The sirup is diluted to the point of incipient turbidity with 2-propanol and crystallization is accelerated by seeding with crystals of lithium maltobionate. In the course of several days crystalline lithium maltobionate in approximately 25 percent yield separates from solution. To remove labeled lithium maltobionate from the mother liquor, 0.2 g. nonlabeled lithium maltobionate is added as a carrier. The solution is concentrated to a thin sirup and 2-propanol is added to the point of incipient turbidity. The crystalline lithium maltobionate that separates contains a large part of the $C^{14}$ labeled maltobionate originally present in the liquor. By the addition of another 0.2 g. portion of lithium maltobionate as a carrier to the mother liquor additional low activity $C^{14}$ labeled salt is obtained. The radiochemical yield of lithium maltobionate-1-$C^{14}$ is approximately 50 percent based on the $C^{14}$ labeled cyanide used.

It will be apparent that the embodiments shown are only exemplary and that various modifications can be made within the scope of our invention as defined in the appended claims.

We claim:

1. A crystalline lithium maltobionate having the formula $LiC_{12}H_{21}O_{12}.3H_2O$.

2. The process of making crystalline lithium maltobionate having the formula $LiC_{12}H_{21}O_{12}.3H_2O$ comprising the steps of electrolyzing a carbon dioxide saturated aqueous solution of maltose hydrate, lithium bromide, and lithium carbonate for a period sufficient to convert the maltose to lithium maltobionate, and crystallizing out the lithium maltobionate.

3. The process of making crystalline lithium maltobionate having the formula $LiC_{12}H_{21}O_{12}.3H_2O$ comprising the steps of electrolyzing a carbon dioxide saturated aqueous solution of maltose hydrate, lithium bromide, and lithium carbonate for a period sufficient to convert the maltose to lithium maltobionate, mixing the resulting solution with a miscible solvent selected from the group consisting of ethanol, methanol, 2-propanol, dioxane, and acetone, and crystallizing out the lithium maltobionate.

4. The process of making crystalline lithium maltobionate having the formula $LiC_{12}H_{21}O_{12}.3H_2O$ comprising the steps of electrolyzing a carbon dioxide saturated aqueous solution of maltose hydrate, lithium bromide and lithium carbonate for a period sufficient to convert the maltose to lithium maltobionate, concentrating the resulting solution, mixing said solution with a miscible solvent selected from the group consisting of ethanol, methanol, 2-propanol, dioxane, and acetone, and crystallizing out the lithium maltobionate.

References Cited in the file of this patent
UNITED STATES PATENTS

| | | |
|---|---|---|
| 1,964,734 | Isbell | July 3, 1934 |
| 1,976,731 | Isbell | Oct. 16, 1934 |

OTHER REFERENCES

Isbell et al.: Bur. Standards Journal of Research, vol. 6, (1931), pages 1145–1152.